(12) United States Patent
Rider et al.

(10) Patent No.: US 8,121,652 B2
(45) Date of Patent: Feb. 21, 2012

(54) PORTABLE ELECTRONIC DEVICE INCLUDING TOUCHSCREEN AND METHOD OF CONTROLLING THE PORTABLE ELECTRONIC DEVICE

(75) Inventors: Douglas Clayton Rider, Ottawa (CA); Michael George Langlois, Ottawa (CA); Jeffrey Brent Kenney, Ottawa (CA)

(73) Assignee: Research In Motion Limited, Waterloo (CA)

( * ) Notice: Subject to any disclaimer, the term of this patent is extended or adjusted under 35 U.S.C. 154(b) by 554 days.

(21) Appl. No.: 12/341,034

(22) Filed: Dec. 22, 2008

(65) Prior Publication Data

US 2010/0159996 A1  Jun. 24, 2010

(51) Int. Cl.
*H04B 1/38* (2006.01)
(52) U.S. Cl. ......... 455/566; 345/173; 345/157; 715/810
(58) Field of Classification Search .................. 455/566; 345/157, 173, 174, 684; 715/702, 764, 773, 715/863, 864
See application file for complete search history.

(56) References Cited

U.S. PATENT DOCUMENTS

| 2006/0022955 | A1 | 2/2006 | Kennedy |
| 2008/0098331 | A1 | 4/2008 | Novick et al. |
| 2009/0193361 | A1* | 7/2009 | Lee et al. ............... 715/810 |
| 2010/0085303 | A1* | 4/2010 | Kwok et al. ............ 345/157 |
| 2010/0156814 | A1* | 6/2010 | Weber et al. ........... 345/173 |
| 2010/0265197 | A1* | 10/2010 | Purdy et al. ........... 345/173 |

FOREIGN PATENT DOCUMENTS

WO  03077108 A3  9/2003

OTHER PUBLICATIONS

C.Zwick, B.Schmitz, K. Kühl:"Designing for Small Screens: Mobile Phones, Smart Phones, PDAs, Pocket PCs, Navigation Systems, MP3 Players, Game Consoles", Nov. 21, 2005, Ava Acedemia, ISBN: 2940373078.
European Office Action dated Jan. 17, 2011, issued from the corresponding European patent application.
European Patent Application No. 08172557.4, Search Report dated May 11, 2009.

\* cited by examiner

*Primary Examiner* — Lam T Mai
(74) *Attorney, Agent, or Firm* — Geoffrey deKleine; Borden Ladner Gervais LLP (57) ABSTRACT

A method of controlling a portable electronic device having a touch screen display includes rendering a graphical user interface including a plurality of user-selectable features on the touch screen display and, in response to detecting a touch event on the touch screen display proximal one of the user-selectable features, rendering an indicator for one of the user-selectable features corresponding to a location of the touch event prior to selection of any of the user-selectable features. The indicator is rendered intermediate ones of the user-selectable features for identifying the one of the user-selectable features absent obstruction of other ones of the user-selectable features.

9 Claims, 8 Drawing Sheets

Figure 8 ns and
PORTABLE ELECTRONIC DEVICE INCLUDING TOUCHSCREEN AND METHOD OF CONTROLLING THE PORTABLE ELECTRONIC DEVICE

FIELD OF TECHNOLOGY

The present disclosure relates to portable electronic devices that include touch screen displays for user interaction.

BACKGROUND

Electronic devices, including portable electronic devices, have gained widespread use and can provide a variety of functions including, for example, telephonic, electronic messaging and other personal information manager (PIM) application functions. Portable electronic devices can include several types of devices including mobile stations such as simple cellular telephones, smart telephones, wireless PDAs, and laptop computers with wireless 802.11 or Bluetooth capabilities. These devices run on a wide variety of networks from data-only networks such as Mobitex and DataTAC to complex voice and data networks such as GSM/GPRS, CDMA, EDGE, UMTS and CDMA2000 networks.

Devices such as PDAs or smart telephones are generally intended for handheld use and ease of portability. Smaller devices are generally desirable for portability. Touch screen devices constructed of a display, such as a liquid crystal display, with a touch-sensitive overlay are useful on such handheld devices as such handheld devices are small and are therefore limited in space available for user input and output devices. Further, the screen content on the touch screen devices can be modified depending on the functions and operations being performed.

These devices suffer from disadvantages, however. For example, with decreasing size of electronic devices, user-selectable features such as buttons displayed on the touch screen display of the portable electronic device are limited in size. When displaying a number of user-selectable features such as buttons of a virtual keyboard, user selection becomes difficult as the buttons are small and the placement of the user's finger can be inexact. Thus, selection errors may be made as a result of target inaccuracy and a lack of a touch feedback.

Improvements in portable electronic devices having touch screen displays are therefore desirable.

BRIEF DESCRIPTION OF THE DRAWINGS

Embodiments of the present disclosure will now be described, by way of example only, with reference to the attached Figures, wherein.

DETAILED DESCRIPTION

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limited to the scope of the embodiments described herein.

The disclosure generally relates to an electronic device, which in the embodiments described herein is a portable electronic device. Examples of portable electronic devices include mobile, or handheld, wireless communication devices such as pagers, cellular phones, cellular smartphones, wireless organizers, personal digital assistants, wirelessly enabled notebook computers and the like.

The portable electronic device may be a two-way communication device with advanced data communication capabilities including the capability to communicate with other portable electronic devices or computer systems through a network of transceiver stations. The portable electronic device may also have the capability to allow voice communication. Depending on the functionality provided by the portable electronic device, it may be referred to as a data messaging device, a two-way pager, a cellular telephone with data messaging capabilities, a wireless Internet appliance, or a data communication device (with or without telephony capabilities). The portable electronic device may also be a portable device without wireless communication capabilities as a handheld electronic game device, digital photograph album, digital camera and the like.

Reference is first made to the Figures to describe an embodiment of a portable electronic device including a touch screen display and a method of controlling the portable electronic device. The method includes rendering a graphical user interface including a plurality of user-selectable features on the touch screen display; and in response to detecting a touch event on the touch screen display proximal one of the user-selectable features, rendering an indicator for the one of the user-selectable features corresponding to a location of the touch event prior to selection of any of the user-selectable features. The indicator is rendered intermediate ones of the user-selectable features for identifying the one of the user-selectable features absent obstruction of other ones of the user-selectable features.

Figure 1:
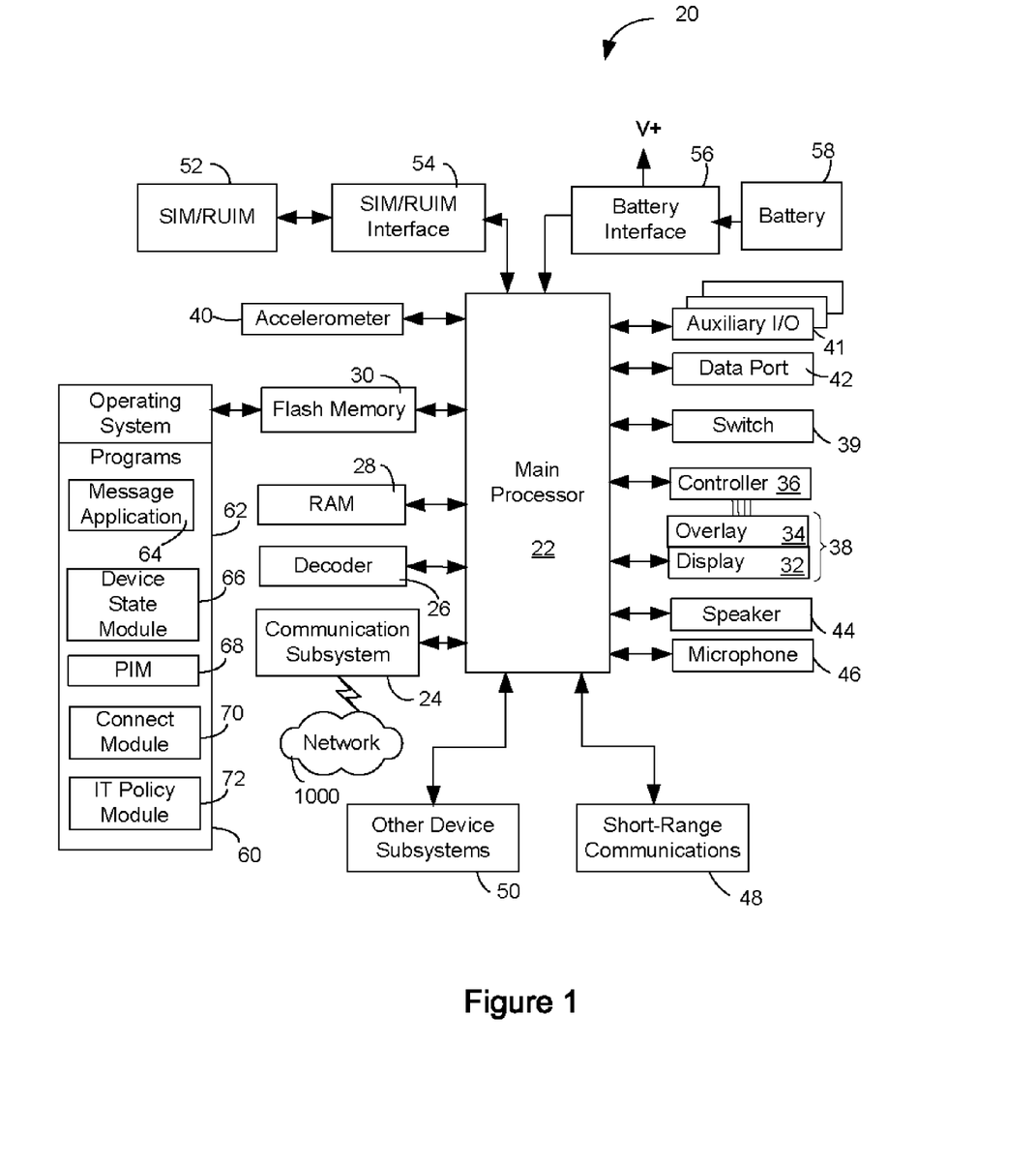
FIG. 1 is a simplified block diagram of components including internal components of a portable electronic device according an aspect of an embodiment.

Referring to FIG. 1, there is shown therein a block diagram of an exemplary embodiment of a portable electronic device 20. The portable electronic device 20 includes a number of components such as the processor 22 that controls the overall operation of the portable electronic device 20. Communication functions, including data and voice communications, are performed through a communication subsystem 24. Data received by the portable electronic device 20 can be decompressed and decrypted by a decoder 26, operating according to any suitable decompression techniques (e.g. YK decompression, and other known techniques) and encryption techniques (e.g. using an encryption technique such as Data Encryption Standard (DES), Triple DES, or Advanced Encryption Standard (AES)). The communication subsystem 24 receives messages from and sends messages to a wireless network 1000. In this exemplary embodiment of the portable electronic device 20, the communication subsystem 24 is configured in accordance with the Global System for Mobile Communication (GSM) and General Packet Radio Services (GPRS) standards. The GSM/GPRS wireless network is used worldwide. New standards, such as Enhanced Data GSM Environment (EDGE) and Universal Mobile Telecommunications Service (UMTS) are believed to have similarities to the network behavior described herein, and it will also be understood by persons skilled in the art that the embodiments described herein are intended to use any other suitable standards that are developed in the future. The wireless link connecting the communication subsystem 24 with the wireless network 1000 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 1000 associated with the portable electronic device 20 is a GSM/GPRS wireless network in one exemplary implementation, other wireless networks may also be associated with the portable electronic device 20 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The processor 22 also interacts with additional subsystems such as a Random Access Memory (RAM) 28, a flash memory 30, a display 32 with a touch-sensitive overlay 34 connected to an electronic controller 36 that together make up a touch screen display 38, a switch 39, an accelerometer 40, an auxiliary input/output (I/O) subsystem 41, a data port 42, a speaker 44, a microphone 46, short-range communications 48 and other device subsystems 50. The touch-sensitive overlay 34 and the electronic controller 36 provide a touch-sensitive input device and the processor 22 interacts with the touch-sensitive overlay 34 via the electronic controller 36.

Some of the subsystems of the portable electronic device 20 perform communication-related functions, whereas other subsystems may provide "resident" or on-device functions. By way of example, the display 32 and the touch-sensitive overlay 34 may be used for both communication-related functions, such as entering a text message for transmission over the network 1000, and device-resident functions such as a calculator or task list.

The accelerometer 40 includes a cantilever beam with a proof mass and suitable deflection sensing circuitry. The accelerometer 40 is used for detecting direction of gravitational forces (or gravity-induced reaction forces). Movement of the portable electronic device 20 to alternate orientations can be detected and the orientation of the accelerometer 40 and therefore of the portable electronic device 20 can be determined.

The portable electronic device 20 can send and receive communication signals over the wireless network 1000 after network registration or activation procedures have been completed. Network access is associated with a subscriber or user of the portable electronic device 20. To identify a subscriber according to the present embodiment, the portable electronic device 20 uses a SIM/RUIM card 52 (i.e. Subscriber Identity Module or a Removable User Identity Module) inserted into a SIM/RUIM interface 54 for communication with a network such as the network 1000. The SIM/RUIM card 52 is one type of a conventional "smart card" that can be used to identify a subscriber of the portable electronic device 20 and to personalize the portable electronic device 20, among other things. In the present embodiment the portable electronic device 20 is not fully operational for communication with the wireless network 1000 without the SIM/RUIM card 52. By inserting the SIM/RUIM card 52 into the SIM/RUIM interface 54, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM/RUIM card 52 includes a processor and memory for storing information. Once the SIM/RUIM card 52 is inserted into the SIM/RUIM interface 54, it is coupled to the processor 22. In order to identify the subscriber, the SIM/RUIM card 52 can include some user parameters such as an International Mobile Subscriber Identity (IMSI). An advantage of using the SIM/RUIM card 52 is that a subscriber is not necessarily bound by any single physical portable electronic device. The SIM/RUIM card 52 may store additional subscriber information for a portable electronic device as well, including datebook (or calendar) information and recent call information. Alternatively, user identification information can also be programmed into the flash memory 30.

The portable electronic device 20 is a battery-powered device and includes a battery interface 56 for receiving one or more rechargeable batteries 58. In at least some embodiments, the battery 58 can be a smart battery with an embedded microprocessor. The battery interface 56 is coupled to a regulator (not shown), which assists the battery 58 in providing power V+ to the portable electronic device 20. Although current technology makes use of a battery, future technologies such as micro fuel cells may provide the power to the portable electronic device 20.

The portable electronic device 20 also includes an operating system 60 and software components 62 which are described in more detail below. The operating system 60 and the software components 62 that are executed by the processor 22 are typically stored in a persistent store such as the flash memory 30, which may alternatively be a read-only memory (ROM) or similar storage element (not shown). Those skilled in the art will appreciate that portions of the operating system 60 and the software components 62, such as specific software applications 64, 66, 68, 70 and 72, or parts thereof, may be temporarily loaded into a volatile store such as the RAM 28. Other software components can also be included, as is well known to those skilled in the art.

The subset of software components 62 that control basic device operations, including data and voice communication applications, will normally be installed on the portable electronic device 20 during its manufacture. Other software applications include a message application 64 that can be any suitable software program that allows a user of the portable electronic device 20 to send and receive electronic messages. Various alternatives exist for the message application 64 as is well known to those skilled in the art. Messages that have been sent or received by the user are typically stored in the flash memory 30 of the portable electronic device 20 or some other suitable storage element in the portable electronic device 20. In at least some embodiments, some of the sent and received messages may be stored remotely from the device 20 such as in a data store of an associated host system that the portable electronic device 20 communicates with.

The software components 62 can further include a device state module 66, a Personal Information Manager (PIM) 68, and other suitable modules (not shown). The device state module 66 provides persistence, i.e. the device state module 66 ensures that important device data is stored in persistent memory, such as the flash memory 30, so that the data is not lost when the portable electronic device 20 is turned off or loses power.

The PIM 68 includes functionality for organizing and managing data items of interest to the user, such as, but not limited to, e-mail, contacts, calendar events, voice mails, appointments, and task items. The PIM 68 has the ability to send and receive data items via the wireless network 1000. PIM data items may be seamlessly integrated, synchronized, and updated via the wireless network 1000 with the portable electronic device subscriber's corresponding data items stored and/or associated with a host computer system. This functionality creates a mirrored host computer on the portable electronic device 20 with respect to such items. This can be particularly advantageous when the host computer system is the portable electronic device subscriber's office computer system.

The software components 62 also includes a connect module 70, and an information technology (IT) policy module 72. The connect module 70 implements the communication protocols that are required for the portable electronic device 20 to communicate with the wireless infrastructure and any host system, such as an enterprise system, that the portable electronic device 20 is authorized to interface with.

The connect module 70 includes a set of APIs that can be integrated with the portable electronic device 20 to allow the portable electronic device 20 to use any number of services associated with the enterprise system. The connect module 70 allows the portable electronic device 20 to establish an end-to-end secure, authenticated communication pipe with the host system. A subset of applications for which access is provided by the connect module 70 can be used to pass IT policy commands from the host system to the portable electronic device 20. This can be done in a wireless or wired manner. These instructions can then be passed to the IT policy module 72 to modify the configuration of the device 20. Alternatively, in some cases, the IT policy update can also be done over a wired connection.

Other types of software applications can also be installed on the portable electronic device 20. These software applications can be third party applications, which are added after the manufacture of the portable electronic device 20. Examples of third party applications include games, calculators, utilities, etc.

The additional applications can be loaded onto the portable electronic device 20 through at least one of the wireless network 1000, the auxiliary I/O subsystem 41, the data port 42, the short-range communications subsystem 48, or any other suitable device subsystem 50. This flexibility in application installation increases the functionality of the portable electronic device 20 and may provide enhanced on-device functions, communication-related functions, or both. For example, secure communication applications may enable electronic commerce functions and other such financial transactions to be performed using the portable electronic device 20.

The data port 42 enables a subscriber to set preferences through an external device or software application and extends the capabilities of the portable electronic device 20 by providing for information or software downloads to the portable electronic device 20 other than through a wireless communication network. The alternate download path may, for example, be used to load an encryption key onto the portable electronic device 20 through a direct and thus reliable and trusted connection to provide secure device communication.

The data port 42 can be any suitable port that enables data communication between the portable electronic device 20 and another computing device. The data port 42 can be a serial or a parallel port. In some instances, the data port 42 can be a USB port that includes data lines for data transfer and a supply line that can provide a charging current to charge the battery 58 of the portable electronic device 20.

The short-range communications subsystem 48 provides for communication between the portable electronic device 20 and different systems or devices, without the use of the wireless network 1000. For example, the short-range communications subsystem 48 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download is processed by the communication subsystem 24 and input to the processor 22. The processor 22 then processes the received signal for output to the display 32 or alternatively to the auxiliary I/O subsystem 41. A subscriber may also compose data items, such as e-mail messages, for example, using the touch-sensitive overlay 34 on the display 32 that are part of the touch screen display 38, and possibly the auxiliary I/O subsystem 41. The auxiliary I/O subsystem 41 may include devices such as: a mouse, track ball, infrared fingerprint detector, or a roller wheel with dynamic button pressing capability. A composed item may be transmitted over the wireless network 1000 through the communication subsystem 24.

For voice communications, the overall operation of the portable electronic device 20 is substantially similar, except that the received signals are output to the speaker 44, and signals for transmission are generated by the microphone 46. Alternative voice or audio I/O subsystems, such as a voice message recording subsystem, can also be implemented on the portable electronic device 20. Although voice or audio signal output is accomplished primarily through the speaker 44, the display 32 can also be used to provide additional information such as the identity of a calling party, duration of a voice call, or other voice call related information.

Figure 2:
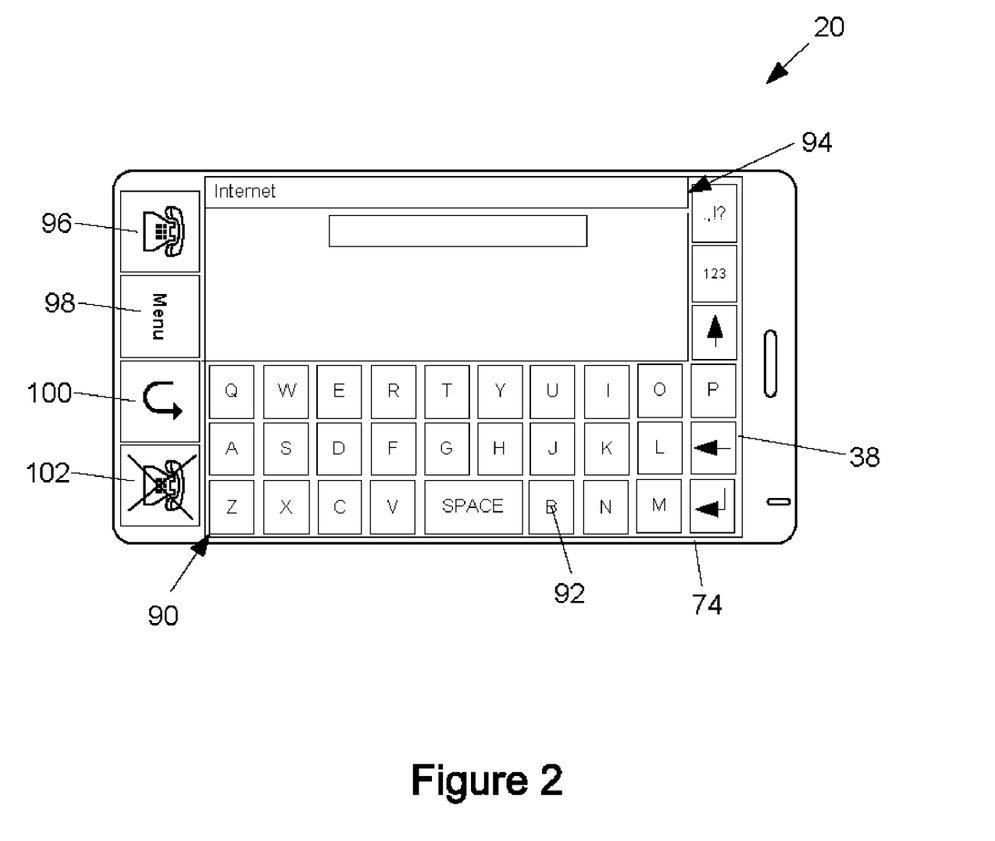
FIG. 2 is a front view of an exemplary portable electronic device including a touch screen display.

Reference is now made to FIG. 2, which shows a front view of an exemplary portable electronic device 20 in landscape orientation. The portable electronic device 20 includes a housing 74 that houses the internal components that are shown in FIG. 1 and frames the display 32 and the touch-sensitive overlay 34 of the touch screen display 38 such that the display 32 and touch-sensitive overlay 34 of the touch screen display 38 are exposed for user-interaction therewith when the portable electronic device 20 is in use. In the exemplary orientation shown in FIG. 2, the touch screen display 38 includes a virtual keyboard 90 for user entry of data in the form of, for example, text during operation of the portable electronic device 20. It will be appreciated that such a virtual keyboard may be used for data entry in any suitable application such as in an electronic mail application, during electronic mail composition or in any other suitable application. The virtual keyboard 90 of FIG. 2 is provided for data entry in an Internet browser application and is shown as a QWERTY keyboard for exemplary purposes. The present disclosure is not limited to the virtual keyboard 90 shown as other keyboards are possible.

Figure 3:
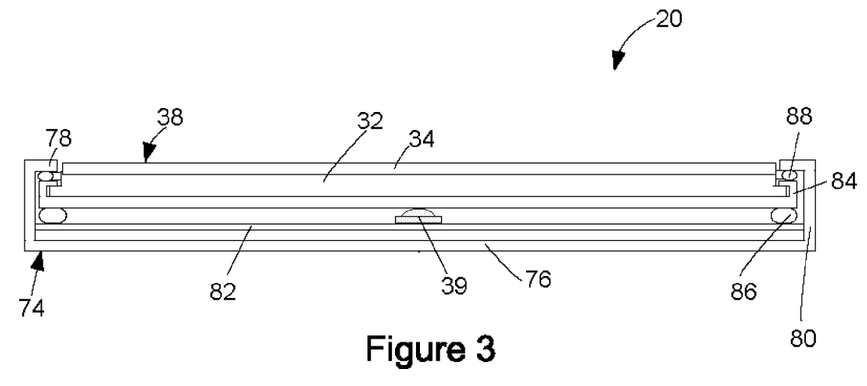
FIG. 3 is a simplified sectional side view of the portable electronic device of FIG. 2 (not to scale), with a switch shown in a rest position.

The housing can be any suitable housing for the internal components shown in FIG. 1. As best shown in FIG. 3, the housing 74 in the present example includes a back 76, a frame 78, which frames the touch screen display 38, sidewalls 80 that extend between and generally perpendicular to the back 76 and the frame 78, and a base 82 that is spaced from and generally parallel to the back 76. The base 82 can be any suitable base and can include, for example, a printed circuit board or flex circuit board. The back 76 includes a plate (not shown) that is releasably attached for insertion and removal of, for example, the battery 58 and the SIM/RUIM card 52 described above. It will be appreciated that the back 76, the sidewalls 80 and the frame 78 can be injection molded, for example. In the exemplary portable electronic device 20 shown in FIG. 2, the frame 78 is generally rectangular with rounded corners although other shapes are possible.

The display 32 and the touch-sensitive overlay 34 can be supported on a support tray 84 of suitable material such as magnesium for providing mechanical support to the display 32 and touch-sensitive overlay 34. The display 32 and touch-sensitive overlay 34 are biased away from the base 82, toward the frame 78 by biasing elements 86 such as gel pads between the support tray 84 and the base 82. Compliant spacers 88, which can also be in the form of gel pads for example, are located between an upper portion of the support tray 84 and the frame 78. The touch screen display 38 is moveable within the housing 74 as the touch screen display 38 can be moved toward the base 82, thereby compressing the biasing elements 86. The touch screen display 38 can also be pivoted within the housing 74 with one side of the touch screen display 38 moving toward the base 82, thereby compressing the biasing elements 86 on the same side of the touch screen display 38 that moves toward the base 82.

In the present example, the switch 39 is supported on one side of the base 82 which can be printed circuit board while the opposing side provides mechanical support and electrical connection for other components (not shown) of the portable electronic device 20. The switch 39 can be located between the base 82 and the support tray 84. The switch 39, which can be a mechanical dome-type switch, for example, can be located in any suitable position such that displacement of the touch screen display 38 resulting from a user pressing the touch screen display 38 with sufficient force to overcome the bias and to overcome the actuation force for the switch 39, depresses and actuates the switch 39. In the present embodiment the switch 39 is in contact with the support tray 84. Thus, depression of the touch screen display 38 by user application of a force thereto causes actuation of the switch 39 and thereby provides the user with a positive tactile feedback during user interaction with the user interface of the portable electronic device 20. The switch 39 is not actuated in the rest position shown in FIG. 3, absent applied force by the user. Thus, withdrawal of the applied force on the touch screen display 38 after actuation of the switch 39 causes the switch 39 to return to the rest position. It will now be appreciated that the switch 39 can be actuated by pressing anywhere on the exposed touch screen display 38 to cause movement of the touch screen display 38 in the form of movement parallel with the base 82 or pivoting of one side of the touch screen display 38 toward the base 82. The switch 39 is connected to the processor 22 and can be used for further input to the processor when actuated. Although a single switch is shown any suitable number of switches can be used.

The touch screen display 38 can be any suitable touch screen display such as a capacitive touch screen display, a resistive touch screen display or any other suitable touch screen display. In one example the touch screen display is a capacitive touch screen display 38. A capacitive touch screen display 38 includes the display 32 and the touch-sensitive overlay 34, in the form of a capacitive touch-sensitive overlay 34. It will be appreciated that the capacitive touch-sensitive overlay 34 includes a number of layers in a stack and is fixed to the display 32 via a suitable optically clear adhesive. The layers can include, for example a substrate fixed to the display 32 by a suitable adhesive, a ground shield layer, a barrier layer, a pair of capacitive touch sensor layers separated by a substrate or other barrier layer, and a cover layer fixed to the second capacitive touch sensor layer by a suitable adhesive. The capacitive touch sensor layers can be any suitable material such as patterned indium tin oxide (ITO).

In the present example, the X and Y location of a touch event are both determined with the X location determined by a signal generated as a result of capacitive coupling with one of the touch sensor layers and the Y location determined by the signal generated as a result of capacitive coupling with the other of the touch sensor layers. Each of the touch-sensor layers provides a signal to the controller 36 as a result of capacitive coupling with a suitable object such as a finger of a user or a conductive object held in a bare hand of a user resulting in a change in the electric field of each of the touch sensor layers. The signals represent the respective X and Y touch location values. It will be appreciated that other attributes of the user's touch on the touch screen display 38 can be determined. For example, the size and the shape of the touch on the touch screen display 38 can be determined in addition to the location (X and Y values) based on the signals received at the controller 36 from the touch sensor layers.

Referring again to FIG. 2, it will be appreciated that a user's touch on the touch screen display 38 is determined by determining the X and Y touch location and user-selected input is determined based on the X and Y touch location and the application executed by the processor 22. In the exemplary screen shown in the front view of FIG. 2, the application provides the virtual keyboard 90 and the button of the virtual keyboard 90 selected by the user is matched to the X and Y touch location. Thus, the button for selection by the user is determined based on the X and Y touch location and the application. In the example shown in FIG. 2, the user enters text or any other characters via the virtual keyboard 90, selecting characters from the virtual keyboard 90 by touching the touch screen display 38 at the location of the characters on the virtual keyboard 90 and actuating the switch 39 as a result of applied force on the touch screen display 38 as described above.

In the present example, the portable electronic device includes four physical buttons 96, 98, 100, 102 in the housing 74 for user-selection for performing functions or operations including an "off-hook" button 96 for placing an outgoing cellular telephone call or receiving an incoming cellular telephone call, a Menu button 98 for displaying a context-sensitive menu or submenu, an escape button 100 for returning to a previous screen or exiting an application, and an "on-hook" button 102 for ending a cellular telephone call. The remainder of the buttons shown on the face of the exemplary portable electronic device of FIG. 2 are virtual buttons 92 of the virtual keyboard 90 on the touch screen display 38.

Figure 4:
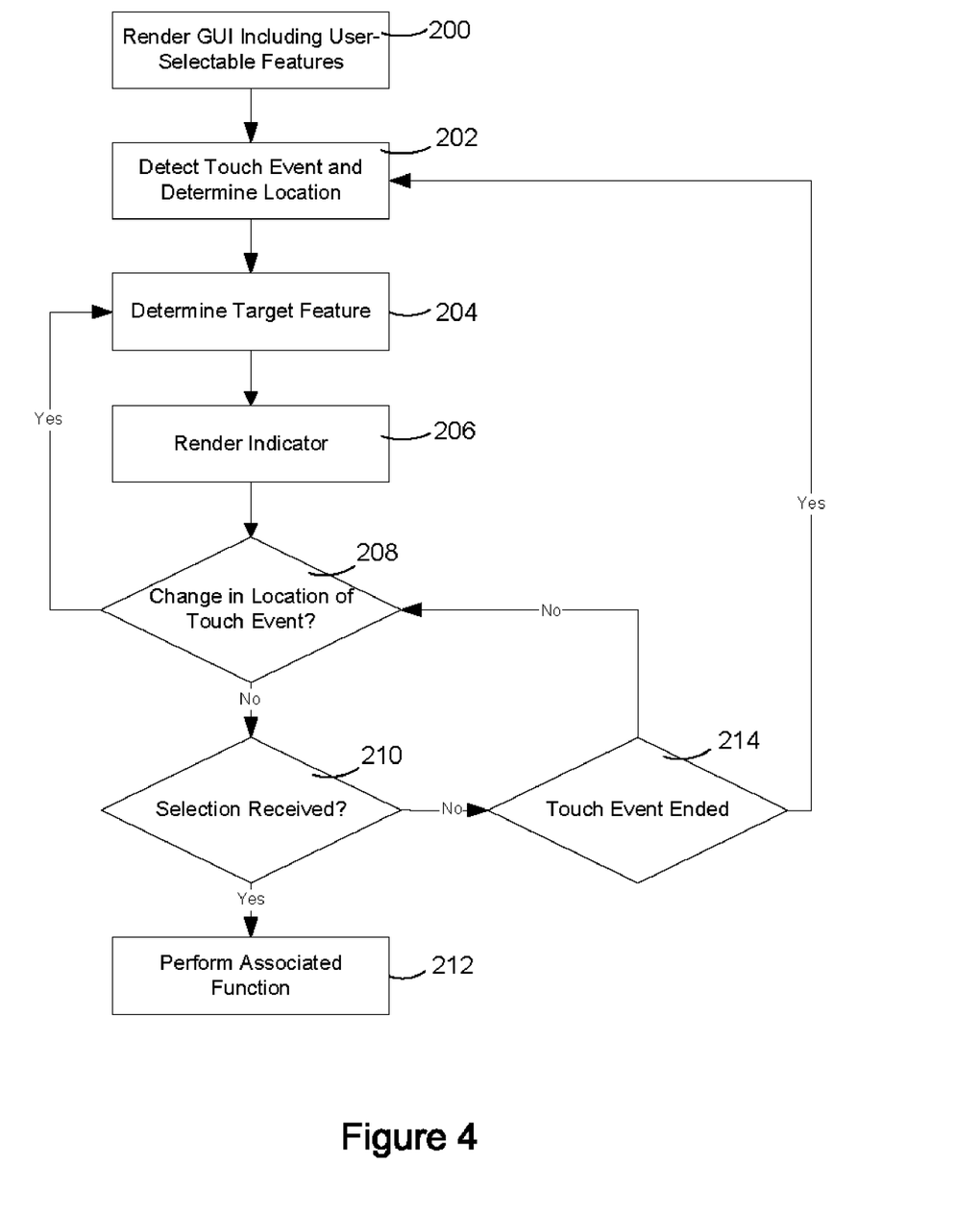
FIG. 4 is a flow chart illustrating a method of controlling the portable electronic device in accordance with an aspect of an embodiment.

Reference is now made to FIG. 4 to describe a method of controlling a portable electronic device in accordance with one embodiment. It will be appreciated that the steps of FIG. 4 are carried out by routines or subroutines of software executed by the processor 22. Coding of software for carrying out such steps is well within the scope of a person of ordinary skill in the art having regard to the present description.

A graphical user interface (GUI) is rendered on the touch screen display 38 and includes a plurality of user-selectable features (step 200). In response to detecting a touch event on the touch screen display (step 202) a nearest one of the user selectable features is determined (step 204) and an indicator for the one of the user-selectable features is rendered (step 206). The indicator is rendered intermediate ones of the user-selectable features for identifying the one of the user-selectable features without obstructing the other user-selectable features.

FIG. 4 shows a particular embodiment of the present method. As shown, the processor 22 causes a graphical user interface (GUI) to be rendered (step 200). The GUI may be rendered to provide the user with selectable options or, for example in response to a user-selection of an application or an option in which a plurality of user-selectable features are rendered. Signals are sent from the touch-sensitive overlay 34 to the controller 36 when a touch event is detected and the X and Y location of the touch event is determined (step 202). For the purpose of the present description, a touch event can be a finger or other suitable object contacting the touch screen display 38 or a finger or other suitable object close to the touch screen display 38 such that the presence of the finger or other object is detected by the touch screen display 38, for example, by capacitive coupling in the case of the capacitive touch screen display. The closest user-selectable feature is determined based on the X and Y location of the touch event (step 204) and, in response to detecting the touch event, an indicator is rendered intermediate ones of the user-selectable features absent obstruction of the other ones of the user-selectable features (step 206). The indicator can be rendered between user-selectable features or along a border or borders, for example, of user-selectable features and thus is located intermediate ones of the user-selectable features without obstructing the other user-selectable features. If a change in the X and Y location of the touch event is determined (step 208) as a result of the user moving their finger or other suitable object relative to the touch screen display 38, the closest user-selectable feature is again determined (step 204) and the indicator rendered in the appropriate position (step 206). If there is no change in the X and Y location of the touch event as determined at step 208, it is determined if selection of the indicated user-selectable feature is received (step 210). If so, the associated function is performed (step 212). If, on the other hand selection is not received, it is determined if the touch event has ended (step 214) and, if so, the method returns to step 202 for detection of a touch event. If the touch event has not ended, the method returns to step 208 to determine if the location of the touch event has changed.

The user is therefore provided with an indicator as to which user-selectable feature is closest to the object prior to selection without obscuring any of the other user-selectable features so that the position of the touch event (the user's touch) can be adjusted to ensure the desired user-selectable feature is indicated prior to selection.

It will be appreciated that the method shown and described with reference to FIG. 4 is simplified for the purpose of the present explanation and other steps and substeps may be included.

Figure 5:
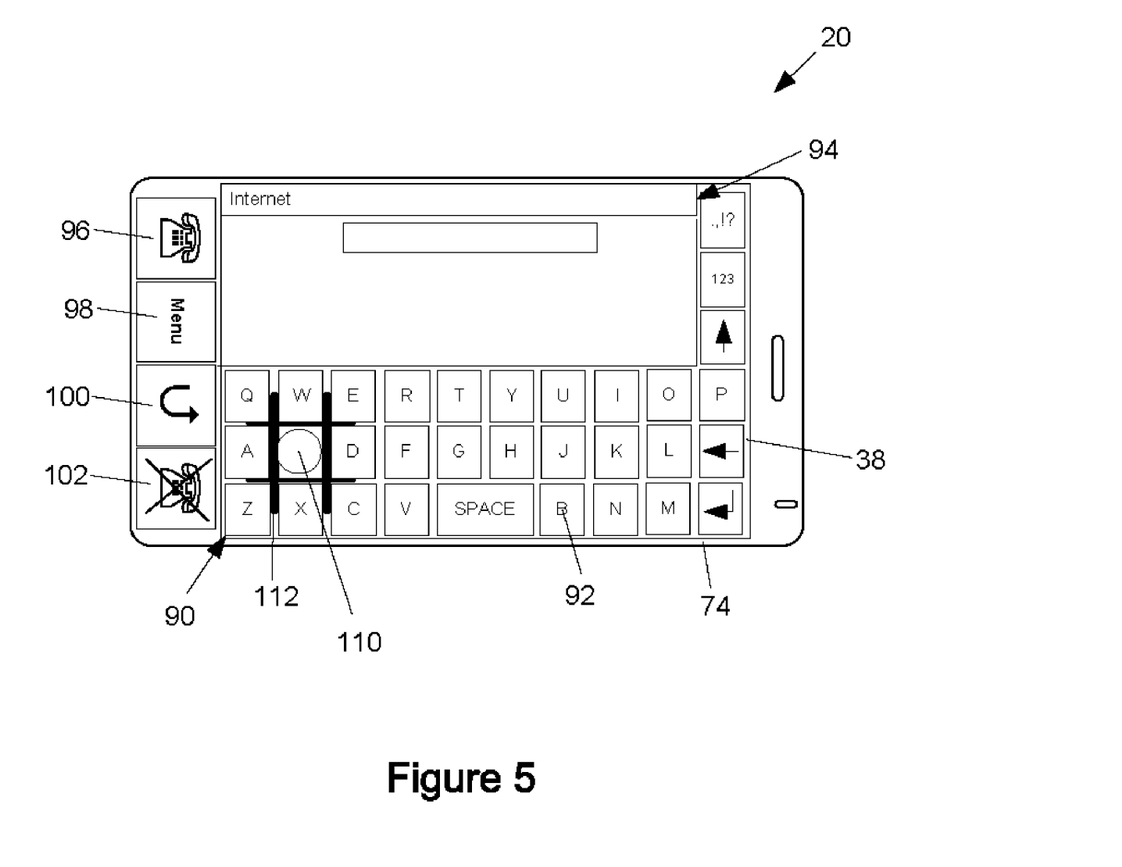
FIGS. 5 and 6 are front views of the exemplary portable electronic device, similar to the view of FIG. 2, illustrating one exemplary GUI in the method of FIG. 4.

Continued reference is made to FIG. 4 and to FIG. 5 to describe an example of the method of controlling a portable electronic device 20 in accordance with the embodiment of FIG. 4. The present example is provided for better understanding and is not intended to limit the scope of the present disclosure.

According to the present example, a GUI is rendered in an application, such as an Internet browser application for browsing the Internet (step 200). User-selectable features in the form of the virtual buttons 92 of the virtual keyboard 90 are rendered (step 202). The virtual keyboard 90 in the present example is a full QWERTY keyboard on the touch screen display 38 of the portable electronic device 20 in which each alphabetical letter is associated with a respective one of the plurality of virtual buttons 92 that together make up virtual keyboard 90. The virtual keyboard 90 is rendered along with the display area 94

Data entry in the form of characters in the Internet browser application can be carried out in the GUI shown in FIG. 5. A touch event at or closest to any one of the virtual buttons 92 can be detected and the X and Y location of the touch event is determined (step 202). In the example shown in FIG. 5, a touch event occurs in the form of a finger located on the touch screen display 38 at a position illustrated by the numeral 110. The X and Y location of the touch event is determined and the target feature is determined to be the button associated with the letter "S" based on the location and the application GUI on the touch screen display 38 at the time the touch event is detected (step 204). The indicator 112 is then rendered on the touch screen display 38 (step 204). As shown in FIG. 5, the indicator 112 includes a number of lines in a grid pattern that forms a pound sign. Each of the lines of the indicator 112 is rendered intermediate ones of the virtual buttons 92 such that the lines are located in the spaces between the virtual buttons 92. The virtual button associated with the letter "S" that was determined to be the closest virtual button is located at the center of the grid pattern. Thus, the virtual button is indicated even with the user's finger located over the button. The lines of the grid pattern of the indicator can extend past the periphery of the user-selectable feature for identifying the one of the features (the button associated with the letter "S" in the present example), even when a finger is covering the letter Further, the remainder of the virtual buttons 92 are not obscured by the indicator 112 as the indicator 112 is rendered intermediate the virtual buttons 92. If the user wishes to select a letter other than the one indicated, the letters are not obscured and the user can readily identify the desired one of the virtual buttons 92 and slide or move his or her finger to the desired virtual button, causing the indicator to be rendered again to indicate the new one of the virtual buttons 92.

Figure 6:
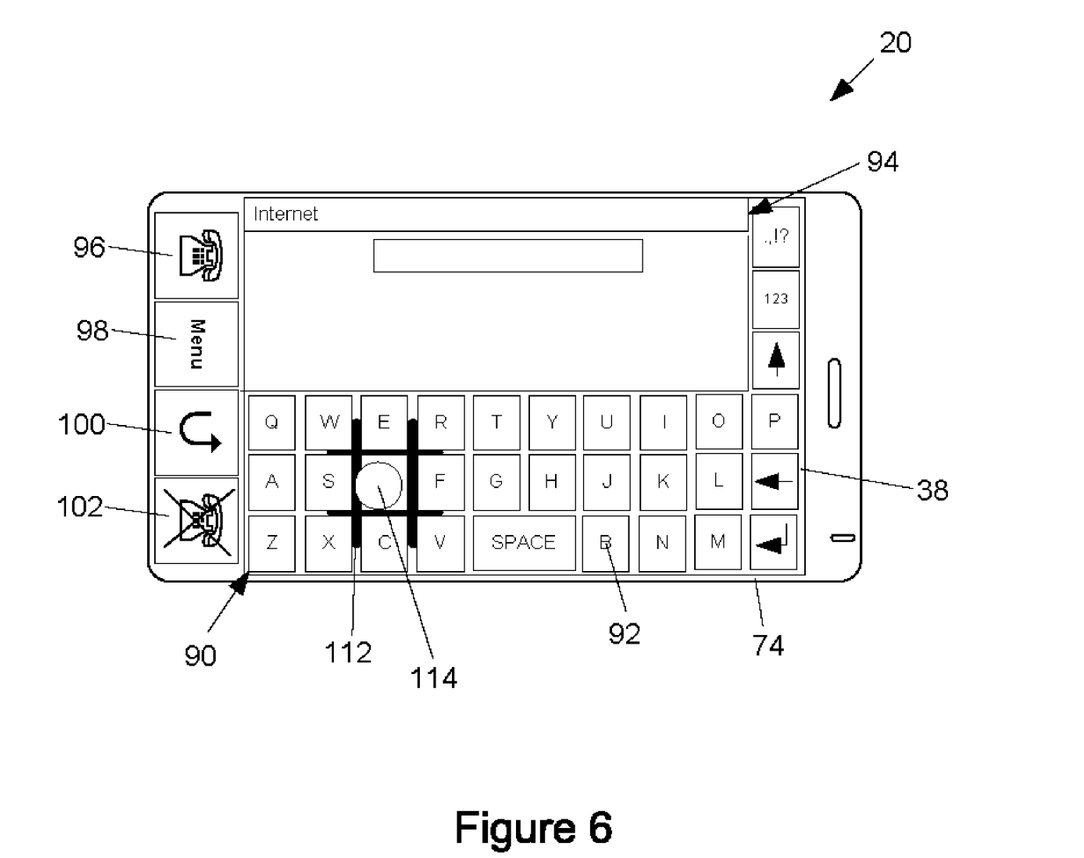

Continuing with the present example, if the user wishes to select the letter "D", the user can slide his or her finger in the direction of the letter "D" and the change in the location of the touch event to the new location, indicated by the numeral 114, is detected by the change in the X and Y location values (step 208). With movement of the touch location to the button associated with letter "D", the target feature is determined to be the button associated with the letter "D (step 204). The indicator 112 is then rendered on the touch screen display 38 such that the grid pattern in the form of the pound sign is centered around the button associated with the letter "D" as shown in FIG. 6 (step 204).

If there is no further change in the X and Y location of the touch event as determined at step 208, it is determined if selection of the indicated user-selectable feature is received. In the present example, there is no further change in the X and Y location of the touch event and selection of the virtual button associated with the letter "D" is received (step 210). In the present embodiment, selection is received when a signal is received from the switch 39 resulting from depression of the touch screen display 38 with sufficient force to cause movement of the touch screen display 39 in the form of pivoting, against the bias of the touch screen display 38 and against the actuation force of the switch 39, to thereby actuate the switch 39.

Absent actuation of the switch 39 caused by depression of the touch screen display 38, the method proceeds to step 214 where a further change in the location of touch can be detected. If the switch 39 is actuated, however, the process proceeds to step 212 where a function associated with the location of the navigation indicator at the time of release of the switch 39 and therefore at the time the signal is sent from the switch 39 to the processor 22, is performed. The function performed is therefore dependent on the location of the navigation indicator at the time the switch 39 is released and on the application and GUI in which the navigation indicator is provided. In the present example, the letter "D" is added in a URL field 116 in the display area 94.

Figure 7:
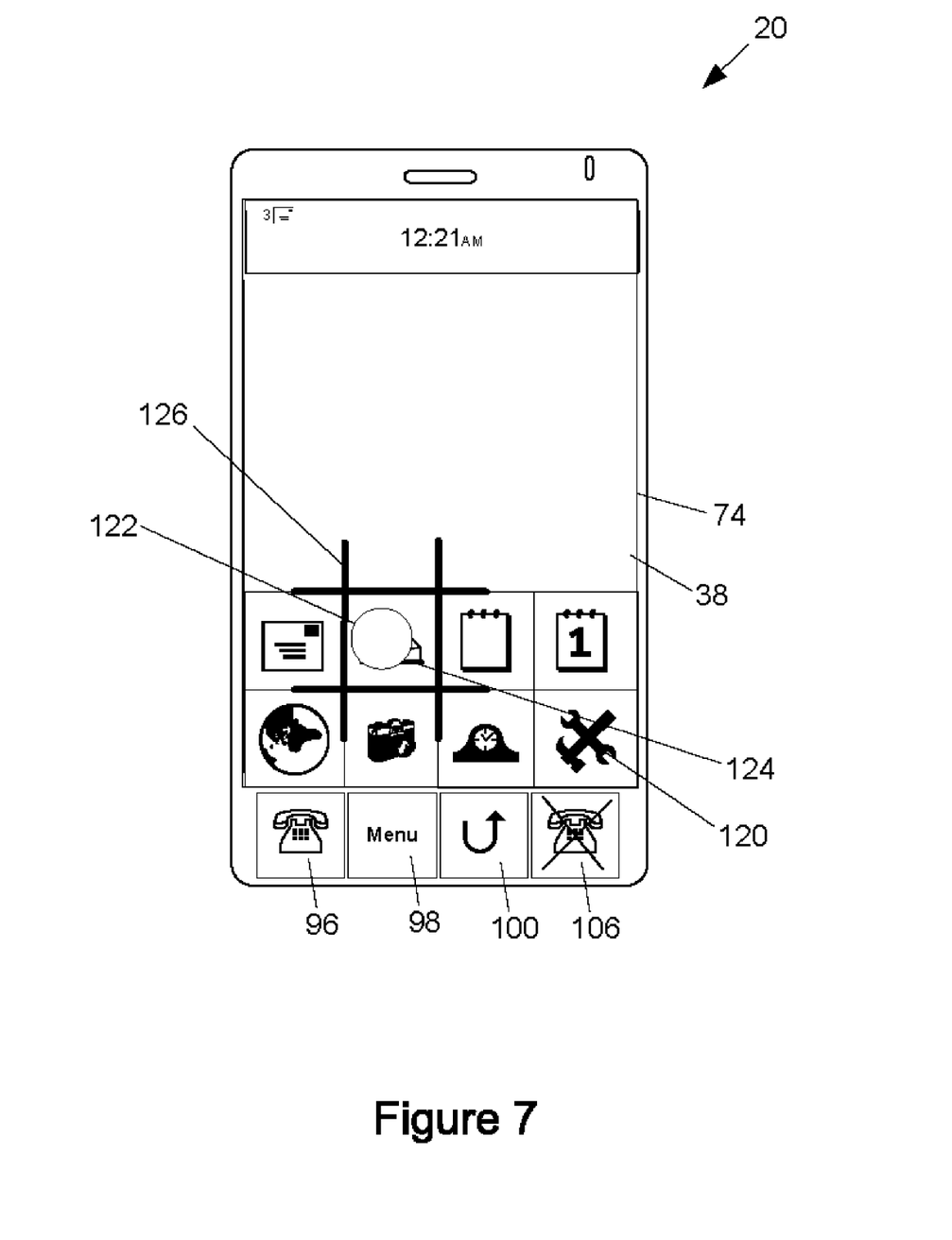
FIG. 7 is a front view of the exemplary portable electronic device illustrating another exemplary GUI in the method of FIG. 4.

Reference is now made to FIG. 4 and to FIG. 7 to describe another example of the method of controlling a portable electronic device 20 in accordance with the embodiment of FIG.

4. In the present example, the GUI rendered at step 200 is a main menu GUI including a plurality of user-selectable features in the form of icons 120. Each of the icons 120 is selectable for launching an associated application, for example. As shown, the icons 120 are not spaced apart but, instead, are arranged adjacent other icons such that each icon shares a border line with at least one other of the icons 120.

A touch event at or closest to any one of the icons 120 can be detected and the X and Y location of the touch event is determined (step 202). In the example shown in FIG. 7, a touch event occurs in the form of a finger touching the touch screen display 38 at a position illustrated by the numeral 122. The X and Y location of the touch event is determined and the target feature is determined to be an electronic address book icon 124 based on the location and the GUI on the touch screen display 38 at the time the touch event is detected (step 204). An indicator 126 is then rendered on the touch screen display 38 (step 206). Again, the indicator 126 includes a number of lines in a grid pattern that forms a pound sign. Each of the lines of the indicator 126 in the present example is rendered intermediate ones of the virtual buttons 92 such that the lines are located on the border lines between the icons 120.

The electronic address book icon 124 is located at the center of the grid pattern. Thus, the address book icon 124 is indicated even with the user's finger located over the icon. Further, the remainder of the icons 120 are not obscured by the indicator 112 as the indicator 112 is rendered intermediate the virtual buttons 92. The remainder of the steps of the method are similar to those previously described and therefore are not further described herein.

Figure 8:
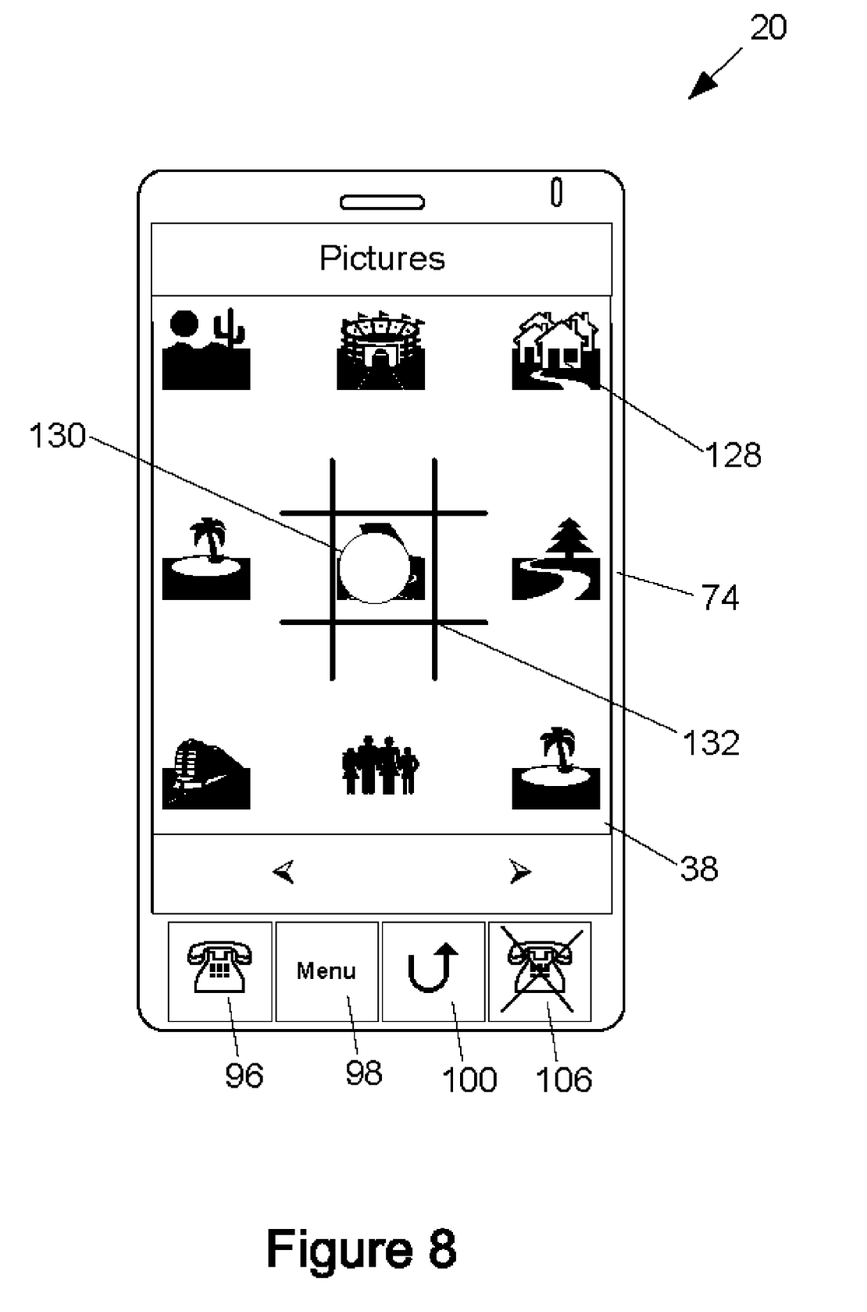
FIG. 8 is a front view of the exemplary portable electronic device illustrating yet another exemplary GUI in the method of FIG. 4.

Reference is now made to FIG. 4 and to FIG. 8 to describe yet another example of the method of controlling a portable electronic device 20 in accordance with the embodiment of FIG. 4. In the present example, the GUI rendered at step 200 is a picture viewing GUI including a plurality of user-selectable features in the form of thumbnail pictures 128. Each of the thumbnail pictures 128 is selectable for viewing at a larger size, for example. As shown, the thumbnail pictures 128 are spaced apart in the present example.

A touch event at or closest to any one of the thumbnail pictures 128 can be detected and the X and Y location of the touch event is determined (step 202). In the example shown in FIG. 8, a touch event occurs in the form of a finger touching the touch screen display 38 at a position illustrated by the numeral 130. The X and Y location of the touch event is determined and the target feature is determined to be one of the thumbnail pictures 128 based on the location and the GUI on the touch screen display 38 at the time the touch event is detected (step 204). An indicator 132 is then rendered on the touch screen display 38 (step 204). Again, the indicator 132 includes a number of lines in a grid pattern that forms a pound sign. Each of the lines of the indicator 132 in the present example is rendered intermediate ones of the virtual buttons 92 such that the lines are located between the thumbnail pictures 128. The one of the thumbnail pictures 128 determined to be closest to the touch location is located at the center of the grid pattern. The remainder of the thumbnail pictures 128 are not obscured by the indicator 132. The remainder of the steps of the method are similar to those previously described and therefore are not further described herein.

In other embodiments, selection can be determined to be received when the touch event ends when the user lifts his or her finger, for example. Thus, if selection is not received at step 210 (in other words, the user does not lift the finger or suitable object from the display and thereby end the touch event), the method returns to step 208, for example. In still other embodiments, some of the lines of the indicator may not extend past the periphery in both directions for example, to avoid obscuring a button or other user-selectable feature that is adjacent and is larger or offset from the identified one of the user-selectable features. In still further embodiments, the indicator can be rendered in an alternate color or in a white or light line, for example, if the user-selectable features are dark or black.

As indicated above, the method shown and described with reference to FIG. 4 is simplified for the purpose of the present explanation and other steps and substeps may be included. Further, the order of some of the steps may differ. In the above-described exemplary embodiment, the indicator is rendered centered around closest one of the user-selectable features upon detection of a touch event on the touch screen display 38. It is possible that the indicator is only rendered around the closest one of the user-selectable features if the X and Y location of the touch event is determined to be within a threshold distance of the closest one of the user-selectable features, for example. Alternatively, it is possible that the indicator is only rendered around the user-selectable feature if the X and Y location of the touch event is determined to be at the user-selectable feature.

According to one aspect, there is provided a method of controlling a portable electronic device having a touch screen display. The method includes rendering a graphical user interface including a plurality of user-selectable features on the touch screen display and, in response to detecting a touch event on the touch screen display proximal one of the user-selectable features, rendering an indicator for one of the user-selectable features corresponding to a location of the touch event prior to selection of any of the user-selectable features. The indicator is rendered intermediate ones of the user-selectable features for identifying the one of the user-selectable features absent obstruction of other ones of the user-selectable features.

According to another aspect, there is provided a portable electronic device. The portable electronic device includes a housing, a touch screen display connected to the housing and including a display and touch-sensitive overlay exposed for user-interaction therewith, and functional components in the housing including a memory device and a processor operably connected to the touch screen display and the memory device for executing a program stored in the memory device to cause the portable electronic device to render a graphical user interface including a plurality of user-selectable features on the touch screen display and, in response to detecting a touch event on the touch screen display proximal one of the user-selectable features, render an indicator for one of the user-selectable features corresponding to a location of the touch event prior to selection of any of the user-selectable features. The indicator is rendered intermediate ones of the user-selectable features for identifying the one of the user-selectable features absent obstruction of other ones of the user-selectable features According to yet another aspect, there is provided a computer-readable medium having computer-readable code embodied therein for execution by a processor in a portable electronic device comprising a touch screen display, for rendering a graphical user interface including a plurality of user-selectable features on the touch screen display and, in response to detecting a touch event on the touch screen display proximal one of the user-selectable features, rendering an indicator for one of the user-selectable features corresponding to a location of the touch event prior to selection of any of the user-selectable features. The indicator is rendered intermediate ones of the user-selectable features for identifying the one of the user-selectable features absent obstruction of other ones of the user-selectable features.

Advantageously, an indicator is rendered on the touch screen display for identification of the user-selectable feature, such as a virtual button or key of a virtual keyboard. The indicator is rendered prior to selection of the user-selectable feature for identification of the feature at which the touch event is located and is rendered intermediate the user-selectable features so as to avoid obscuring the remaining features. For example, the indicator can be a grid pattern located between spaced-apart user-selectable features and centered around the one of the user-selectable features that corresponds to the touch location. Thus, the user-selectable features remain rendered in the same position and are not obscured or obstructed by the indicator so that the user can readily view and select an alternative feature, for example, by sliding the finger to the alternative feature prior to selection. Rendering of a new screen or window for identifying the feature prior to selection is unnecessary. This reduces time for entry and user-selection errors, decreasing device use time and therefore decreasing power consumption and battery use while increasing user-satisfaction. Furthermore, the user can learn from each selection and improve touch accuracy as a result of the indicator that shows the selection in a grid pattern without obscuring remaining features. Thus, targeting accuracy can be improved as the grid pattern represents the vertical and horizontal location of the selection.

Selection can be carried out by depression of the touch screen display to cause movement of the display toward the base resulting in actuation of a switch disposed between the base and the touch screen display. The switch provides positive tactile feedback to the user confirming selection.

While the embodiments described herein are directed to particular implementations of the portable electronic device and the method of controlling the portable electronic device, it will be understood that modifications and variations may occur to those skilled in the art. All such modifications and variations are believed to be within the sphere and scope of the present disclosure.

The invention claimed is:

1. A method comprising:
displaying a plurality of selectable features on the touch screen display of a portable electronic device;
in response to detecting a touch event on the touch screen display:
  determining a first selectable feature of the plurality of selectable features, which first selectable feature is associated with the touch event;
  displaying an indicator corresponding to the first selectable feature prior to selection of any of the plurality of selectable features,
  wherein the indicator is displayed between the first selectable feature and the selectable features adjacent to the first selectable feature without obstruction of the adjacent selectable features.

2. The method according to claim 1, wherein displaying the indicator comprises displaying lines around the first selectable feature such that the first selectable feature is centered.

3. The method according to claim 2, wherein displaying lines comprises displaying lines in a grid pattern around the first selectable feature.

4. The method according to claim 3, wherein displaying lines comprises displaying lines in the shape of a pound sign.

5. The method according to claim 3, wherein each of the plurality of selectable features is spaced from others of the plurality of selectable features and wherein displaying lines comprises displaying ones of the lines in a space between the plurality of selectable features.

6. The method according to claim 1, wherein the plurality of selectable features comprise virtual buttons of a virtual keyboard.

7. The method according to claim 1, comprising selecting the first selectable feature in response to receipt of an input from actuation of a switch disposed between the touch screen display and a base of the portable electronic device, the switch actuated as a result of an applied force causing movement of the touch screen display toward the base.

8. A portable electronic device comprising:
a touch screen display; and
a processor operably coupled to the touch screen display to cause the portable electronic device to:
  display a plurality of selectable features on the touch screen display,
  in response to detecting a touch event on the touch screen display, determine a first selectable feature of the plurality of selectable features, which first selectable feature is associated with the touch event,
  display an indicator corresponding to the first selectable feature prior to selection of any of the plurality of selectable features,
  wherein the indicator is displayed between the first selectable feature and the selectable features adjacent to the first selectable feature without obstruction of the adjacent selectable features.

9. A non-transitory computer-readable medium having computer-readable code embodied therein executable by a processor in a portable electronic device comprising a touch screen display, for displaying a plurality of selectable features on the touch screen display and, in response to detecting a touch event on the touch screen display, determining a first selectable feature of the plurality of selectable features, which first selectable feature is associated with the touch event, displaying an indicator corresponding to the first selectable feature prior to selection of any of the selectable features, wherein the indicator is displayed between the first selectable feature and the selectable features adjacent the first selectable feature without obstruction of the adjacent selectable features.

* * * * *